(12) United States Patent
Kang et al.

(10) Patent No.: US 6,395,429 B1
(45) Date of Patent: May 28, 2002

(54) SOLID POLYMER ELECTROLYTE EMPLOYING A CROSSLINKING AGENT

(75) Inventors: Yongku Kang; Eun-Kyung Kim, both of Taejeon; Hee-Jung Kim, Pusan; Boo-Keun Oh; Jae-Hyun Cho, both of Taejeon, all of (KR)

(73) Assignees: Samsung SDI Co., Ltd., Kyunggi-do; Korea Research Institute of Chemical Technology, Tacjcon, both of (KR)

( * ) Notice: Subject to any disclaimer, the term of this patent is extended or adjusted under 35 U.S.C. 154(b) by 59 days.

(21) Appl. No.: 09/604,882

(22) Filed: Jun. 28, 2000

(30) Foreign Application Priority Data

Jun. 28, 1999 (KR) .............................. 99-24732

(51) Int. Cl.$^7$ ................................ H01M 6/18

(52) U.S. Cl. .................. 429/306; 429/309; 429/317; 429/322; 429/323

(58) Field of Search ................................ 429/306, 309, 429/317, 322, 323

(56) References Cited

U.S. PATENT DOCUMENTS 6,316,145 B1 * 11/2001 Kida et al. .................. 429/306

* cited by examiner

Primary Examiner—Laura Weiner
(74) Attorney, Agent, or Firm—Lee & Sterba, P.C.

(57) ABSTRACT

A solid polymer electrolyte includes a crosslinking agent, a poly(alkylene glycol) alkyl ether alkyl (meth)acrylate, a lithium salt and a curing initiator. The crosslinking agent includes a compound represented by formula (I):

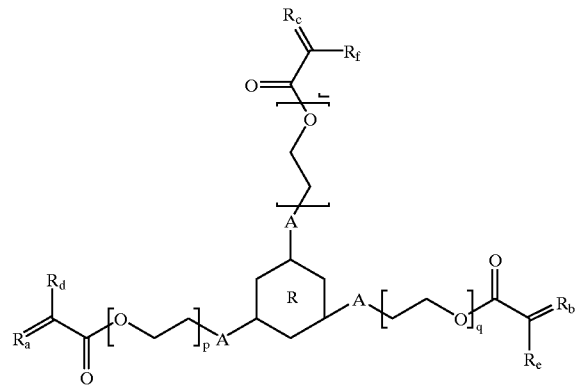

wherein
A is oxygen, COO, alkyl of $C_{1-4}$, or a single bond,
R is a 6-membered aliphatic, aromatic or heterocyclic group,
$R_a$, $R_b$ and $R_c$ independently are a linear or branched alkyl group of $C_{1-10}$,
$R_d$, $R_e$ and $R_f$ independently are H or a methyl group, and
p, q and r independently are an integer of 1 from 20.

The poly(alkylene glycol) alkyl ether alkyl (meth)acrylate is represented by formula (II)

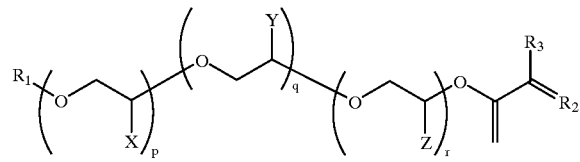

wherein
$R_1$ and $R_2$ independently are a linear or branched aliphatic or aromatic group of $C_{1-10}$,
$R_3$, X, Y, Z independently are H or a methyl group, and
p, q and r independently are an integer from 1 to 20.

16 Claims, 1 Drawing Sheet

SOLID POLYMER ELECTROLYTE EMPLOYING A CROSSLINKING AGENT

FIELD OF THE INVENTION

The present invention relates to crosslinked solid polymer electrolytes for use both in a small capacity lithium polymer secondary battery, which is used in video cameras, portable information terminals such as cellular phones, notebook computers and the like, and in a large capacity lithium polymer secondary battery, which is used in electric cars, power storage devices for power leveling and the like.

BACKGROUND OF THE INVENTION

The lithium polymer secondary battery is attracting attention for its importance as one of three core components of the future information industries, the battery being compared to the heart, the semiconductor being compared to the brain, and the LCD device being compared to the eyes. The reason is that the high performance of the battery as an energy source is a necessity in view of the fact that the future electronic apparatuses that will form a necessary part of human life in the 21st century will become portable, of high performance, of light weighted and compact. At present, in small sized information apparatuses such as portable phones, notebook computers and the like, the use of the lithium ion type secondary battery has speedily advanced. Further, the lithium polymer secondary battery is attracting attention as the battery which makes it possible to save energy through load leveling by storing superfluous power, and as the battery for future portable phones and electric cars. Therefore its importance is widely recognized.

Particularly, in the lithium polymer battery for load leveling and for electric cars, a solid polymer electrolyte is preferably used as the ion conduction medium between the anode and the cathode without using a volatile organic solvent. The advantage of avoiding the use of a volatile organic solvent is apparent for the following reason. That is, the secondary battery for such a use is likely to be operated at a temperature of 60° C. or higher, and therefore, safety is ensured if a volatile organic solvent is not used.

The solid polymer electrolyte was discovered by P. V. Wright in 1975 (British Polymer Journal, vol. 7, p. 319), and M. Armand named it "ion conduction polymer" in 1978. Since that time, its use in the electrochemical devices has been gradually increasing. The typical solid polymer electrolyte is composed of polymers having electron-donating atoms such as oxygen, nitrogen and phosphorus, together with a complex of a lithium salt. The most typical example consists of polyethylene oxide (PEO) and a complex of a lithium salt. This shows a low ion conductivity of about $10^{-8}$ S/cm at room temperature, and therefore, it cannot be applied to the electrochemical devices operating at room temperature. However, it can be used as a power source for electrochemical devices operating at a high temperature.

The ion conductivity of the solid polymer electrolyte is usually increased as the segmental motion of the polymer chain is increased. Therefore, the crystalline region within the polymer structure has to be minimized to increase the non-crystalline region. In connection with this, Blonsky et al. reported on the application of poly(bis (methoxyethoxyethoxy)phosphazine) (J. Am. Chem. Soc., 106, 6945 (1984)). Pantaloni et al. reported on the applicability of poly(ethoxyethoxyethoxy)vinylether (Electrochim. Acta, 34, 635 (1989)). These solid polymer electrolytes which were composed of the above mentioned polymers and a complex of a lithium salt showed an ion conductivity of about $10^{-5}$ S/cm.

However, the linear or branched solid polymer electrolytes showed poor mechanical properties if they were formed into films. Accordingly, in order to solve this problem, a method of crosslinking the linear or branched polymer chains was introduced. Thus, through the crosslinking, the mechanical properties and the thermal properties were improved. Further, the interaction between the PEO chains was decreased, thereby minimizing the crystallization to improve the ion conductivity.

Crosslinking agents which have been used so far include poly(ethylene glycol) diacrylate and poly(ethylene glycol) dimethacrylate, in which acrylates are bonded to both ends of poly(ethylene oxide) (Japanese Patent Laid-open Nos. Hei-3-56803 and Hei-5-36305, and U.S. Pat. No. 5,571, 392). Further, Yuasa Company of Japan obtained a U.S. patent (U.S. Pat. No. 5,240,792) on a network type solid polymer electrolyte in which a monofunctional acryloyl PEO monomer and a difunctional acryloyl PEO monomer are crosslinked. These crosslinked solid polymer electrolytes are mostly cured by high energy beams such as electron beams and ultraviolet lights. After the curing, self-supportive films can be obtained, but the elongation and bending properties are poor, and therefore, they are brittle. Consequently, the battery manufacturing process using these polymer electrolytes becomes very complicated if they are not directly coated on the electrode. Meanwhile, Korean Patent Application No. 97-66096 discloses a solid polymer electrolyte in which the poly(ethylene glycol) dimethacrylate as crosslinking agent has an increased number of the PEO repeating units to partly reinforce the mechanical properties thereof.

SUMMARY OF THE INVENTION

A feature of the present invention is the provision of a new crosslinking agent for manufacturing a solid polymer electrolyte, in which the mechanical properties and the ion conductivity are improved.

Another feature of the present invention is the provision of a solid polymer electrolyte having a three dimensional network structure which is formed by introducing three ethylene glycol acrylate molecules into a cyclic alkyl or hetero-alkyl molecule.

A further feature of the present invention is the provision of a solid polymer electrolyte having a hard segment comprising a 6-membered cyclic structure to which three linear or branched polymer chains are bonded at equal distances from one another, and a soft segment formed by the three linear or branched polymer chains of an oligomeric poly (ethylene oxide). The net structure formed by the hard segment and soft segment functions to improve the mechanical properties of the solid polymer electrolyte and the oligomeric polyethylene oxide functions to dissolve the lithium salt. The resulting solid polymer electrolyte is suitable for use in a lithium polymer secondary battery.

In accordance with one aspect of the present invention, there is provided crosslinking agent including a compound represented by formula (I):

(I)

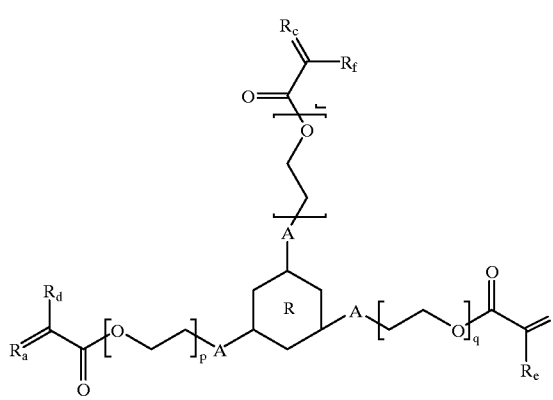

wherein

A is oxygen, COO, alkyl of $C_{1-4}$, or a single bond,

R is a 6-membered aliphatic, aromatic or heterocyclic group, $R_a$, $R_b$ and $R_c$ independently are a linear or branched alkyl group of $C_{1-10}$, $R_d$, $R_e$ and $R_f$ independently are H or a methyl group, and p, q and r independently are an integer from 1 to 20.

In more specific embodiments, the inventive crosslinking agent includes a group R which is selected from the group consisting of cyclohexane, benzene, triazine, trioxane and isocyanurate.

In accordance with another aspect of the present invention, there is provided a solid polymer electrolyte including a crosslinking agent as described above; a poly (alkylene glycol) alkyl ether alkyl (meth)acrylate of formula (II)

(II)

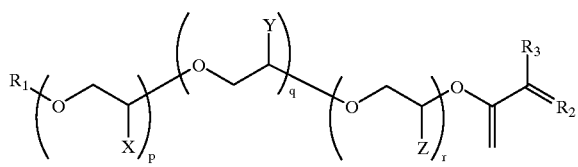

wherein $R_1$ and $R_2$ independently are a linear or branched aliphatic or aromatic group of $C_{1-10}$, $R_3$, X, Y, Z independently are H or a methyl group, and p, q and r independently are an integer from 1 to 20; a lithium salt; and a curing initiator.

According to more particular embodiments, the inventive solid polymer electrolyte further includes a poly(alkylene glycol) dialkyl ether of formula (III):

(III)

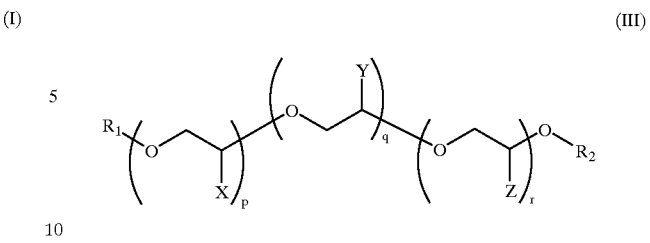

wherein $R_1$ and $R_2$ independently are a linear or branched alkyl group of $C_{1-10}$, X, Y and Z independently are H or a methyl group, and p, q and r independently are 0 or an integer from 1 to 20.

In accordance with still another aspect of the present invention, a lithium polymer secondary battery including an anode, a cathode, and a solid polymer electrolyte as described above is provided.

According to an additional aspect of the present invention, there is provided a solid polymer electrolyte including: a crosslinking agent having a hard segment comprising a 6-member cyclic structure, and soft segments including three linear or branched oligomeric poly(ethylene oxide) chains substituted on the hard segment at the 1,3 and 5 positions; a poly(alkylene glycol) alkyl ether alkyl (meth) acrylate of formula (II) above; a lithium salt; and a curing initiator.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The above features and other advantages of the present invention will become more apparent by describing in detail the preferred embodiment of the present invention with reference to the attached drawing in which.

DETAILED DESCRIPTION OF THE PREFERRED EMBODIMENT

Figure 1:
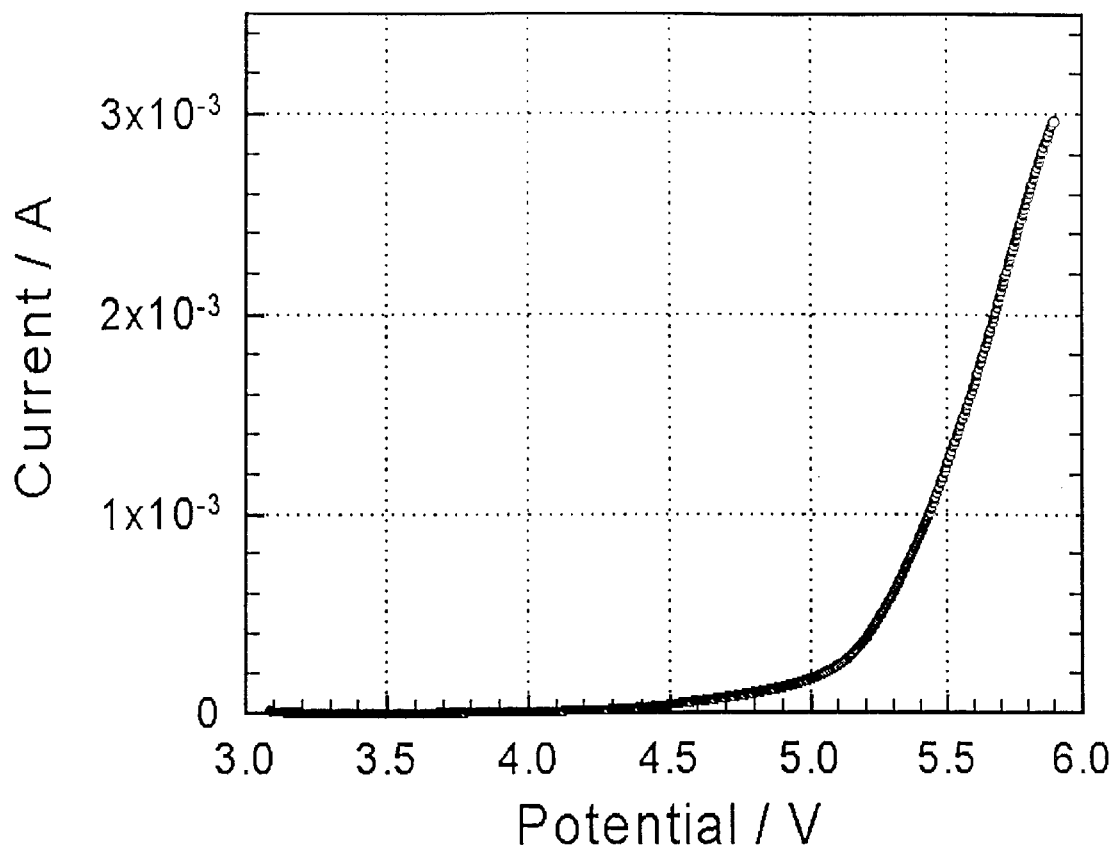
FIG. 1 is a graphical illustration showing the electrochemical stability of the crosslinked solid polymer electrolyte according to the present invention.

The priority Korean Patent Application No. 1999-24732, filed Jun. 28, 1999, is incorporated herein in its entirety by reference.

The present invention provides a crosslinking agent in which three equally spaced, unsaturated functional groups are bonded to a 6-membered cyclic structure as shown by the following formula (I) below:

(I)

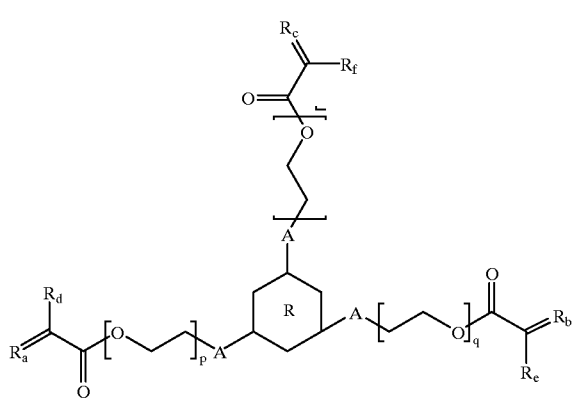

wherein

A is oxygen, COO, alkyl of $C_{1-4}$, or a single bond,

R is a 6-membered aliphatic, aromatic or heterocyclic group, $R_a$, $R_b$ and $R_f$ independently are a linear or branched alkyl group of $C_{1-10}$, $R_d$, $R_e$ and $R_f$ independently are H or a methyl group, and p, q and r independently are an integer from 1 to 20.

In more specific embodiments, R in formula (I) is selected from the group consisting of cyclohexane, benzene, triazine, trioxane and isocyanurate.

The present invention also provides a novel solid polymer electrolyte. The solid polymer electrolyte according to the invention includes a crosslinking agent as described by formula (I) above, a poly(alkylene glycol) alkyl ether alkyl (meth)acrylate having one functional group for assisting to the dissolution of a lithium salt and the formation of a network structure; a lithium salt; and a curing initiator.

The poly(alkylene glycol) alkyl ether alkyl (meth)acrylate employed in the inventive solid polymer electrolyte preferably is described by the following formula (II):

(II)

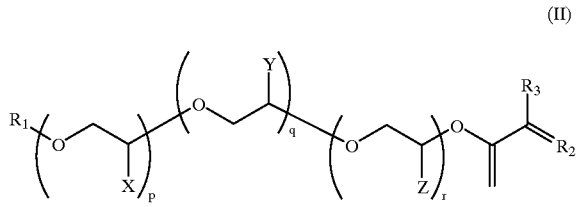

wherein
wherein $R_1$ and $R_2$ independently are a linear or branched aliphatic or aromatic group of $C_{1-10}$, $R_3$, X, Y, Z independently are H or a methyl group, and p, q and r independently are an integer from 1 to 20.

The solid polymer electrolyte according to present invention can further include an optional poly(alkylene glycol) dialkyl ether in addition to the required poly(alkylene glycol) alkyl ether alkyl (meth)acrylate. The poly(alkylene glycol) dialkyl ether for optional use as a polymer or an oligomer in the inventive solid polymer electrolyte is represented by the following formula (III):

(III)

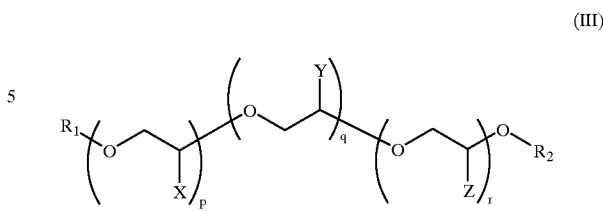

$R_1$ and $R_2$ independently are a linear or branched alkyl group of $C_{1-10}$, X, Y and Z independently are H or a methyl group, and p, q and r independently are 0 or an integer from 1 to 20.

The poly(alkylene glycol) dialkyl ether further serves to dissolve the lithium salt.

The solid polymer electrolyte using the compound of formula (I) in accordance with the present invention is prepared by curing the components by light or by heat. The present invention will be described in detail below.

In the conventional crosslinked solid polymer electrolytes, self-supportive films can be obtained, but the elongation and bending properties are poor, and therefore, they are brittle. Consequently, the battery manufacturing process using these polymer electrolytes becomes very complicated if they are not directly coated on the electrode. This problem has been solved in the present invention.

The present inventors determined that if a solid polymer electrolyte with improved mechanical properties and ionic conductivity is to be developed, a need exists for a new crosslinking agent which is different from the conventional linear or branched acrylate or vinyl crosslinking agent of functionality two or higher. That is, the conventional crosslinking agent includes soft segments formed by linear or branched carbon chains, and therefore, cannot give sufficient mechanical strength. In this context, if the central structure of the crosslinking agent is modified, then the mechanical properties of the solid polymer electrolyte will be improved. Accordingly, when manufacturing the battery, the bending brittleness problem will be solved. This determination led to the present invention.

In order to solve the above-described problems, a 6-membered cyclic structure is introduced to the central portion of the crosslinking agent in the present invention, which is new and utterly different from the conventional central structure having a linear or branched carbon chain. That is, three poly(ethylene glycol) alkylether (meth) acrylates are bonded to a 6-membered cyclic alkyl or hetero-alkyl compound as shown in formula (I) (i.e., at the 1, 3 and 5 positions).

A solid polymer electrolyte prepared with a crosslinking agent according to the invention forms a three-dimensional network structure. In the new solid polymer electrolyte of the present invention, the crosslinking center comprises a hard segment having a 6-membered cyclic structure, and therefore, it maintains regular distances between the linear or branched polymer chains. Soft segments are formed outward from the central portion of the crosslinking agent, bonding to oligomeric ethylene oxides, so that the lithium salt can be dissolved. Thus the two functions of mechanical property reinforcement and lithium salt dissolution can be simultaneously provided, and therefore, the mechanical strength and the ion conductivity are improved. In this manner, a solid polymer electrolyte suitable for use in a lithium polymer secondary battery is provided.

Generally, the ion conductivity of the crosslinked solid polymer electrolyte depends on the content of the the poly(ethylene oxide) oligomer such as poly(ethylene glycol) dimethyl ether within the compound (K. M. Abraham, Z.

Jiang, B. Carroll, Chem. Mater., vol. 9, p. 1978, 1978). That is, in case that poly(ethylene glycol) dimethyl ether having a molecular weight of 250 is used up to 100%, and lithium trifluoromethane sulfonylimide is mixed therein to manufacture a flowable electrolyte, the ion conductivity is measured to be 1.64 mS/cm at 30° C. Accordingly, the poly(ethylene oxide) oligomer has to be added in the maximum amount into the crosslinked solid polymer electrolyte with high ion conductivity, and the electrolyte has to be cured into the form of a film. Compared with the conventional bifunctional or trifunctional crosslinking agent including only the soft segment such as poly(ethylene glycol) dimethacrylate, if the crosslinking agent of the present invention is used, the poly(ethylene oxide) oligomer can be added into the composition in an amount up to about 60 wt % to about 80 wt %, thereby forming the film.

The crosslinking agent which have been developed by the present inventors to improve the mechanical properties and the ion conductivity of the solid polymer electrolyte of the present invention is such that a compound of formula (I) is bonded to three unsaturated functional groups.

The crosslinking agent (1) of formula (I) can be added to a poly(alkylene glycol) alkyl ether alkyl (meth)acrylate (2) of formula (II) having one functional group to prepare a solid polymer electrolyte composition with improved performance. The crosslinking agent is employed in the amount of about 0.1 to about 60 wt % based on the weight of the solid polymer electrolyte, more preferably from about 2 to about 30 wt %, and most preferably from about 5 to about 20 wt %. The oligomeric polyethylene oxide functions to dissolve the lithium salt.

Representative examples of the polymer of formula (II) include, without limitation, poly(ethylene glycol) methyl ether methacrylate; poly(ethylene glycol) methyl ether acrylate; poly(propylene glycol) methyl ether acrylate; and poly(ethylene glycol) phenyl ether acrylate.

The compound of formula (II) having a poly(alkylene glycol) monofunctionality is preferably added in the amount of about 0.1 to about 85 wt % based on the weight of the solid polymer electrolyte, more preferably from about 10 to about 80 wt %, and most preferably from about 20 to about 70 wt %, for the purpose of improving the ion conductivity and of forming the network structure.

In the present invention, in order to improve the ion conductivity and the lithium dissolution, a poly(alkylene glycol) dialkyl ether (5) of formula (III) is optionally used as an oligomer or a polymer.

Representative examples of the compound of formula (III) include, without limitation, poly(ethylene glycol) dimethyl ether; poly(ethylene glycol) diethyl ether; poly(ethylene glycol) dipropyl ether, poly(ethylene glycol) dibutyl ether; poly(ethylene glycol) diglycidyl ether; poly(propylene glycol) dimethyl ether; poly(propylene glycol) diglycidyl ether; poly(propylene glycol)/poly(ethylene glycol) copolymer dibutyl ether; and poly(ethylene glycol)/poly(propylene glycol) block copolymer dibutyl ether.

The poly(alkylene glycol) dialkyl ether of formula (III) is preferably employed in an amount from about 0.1 to about 80 wt % based on the weight of the solid polymer electrolyte for the purpose of improving the ion conductivity of the solid polymer electrolyte.

The lithium salt component (3) which can be used in the present invention includes, without limitation, $LiClO_4$, $LiCF_3SO_3$, $LiBF_4$, $LiPF_6$, $LiAsF_6$, and $Li(CF_3SO_2)_2N$, as well as other lithium salts used in conventional polymer electrolytes. These lithium salts can be added in the amount of about 3 to about 30 wt %, and more preferably from about 5 to about 15 wt %, based on the weight of the polymer electrolyte, but the amount can be controlled in accordance with the required mixing ratio.

In the preparation of solid polymer electrolytes according to the present invention, a curing initiator (4) is added. The initiator can be a photoinitiating type initiator or a thermal initiating type initiator. This initiator preferably is added in an amount from about 0.5 to about 5.0 wt %, based on the weight of the polymer electrolyte, depending on the needs of the polymer electrolyte. Particularly, the ratio of the amount of the initiator to the amount of the poly(alkylene glycol) oligomer or polymer should be proper. This ratio is easily determined by an ordinary skilled person in the art to which the present invention pertains.

Representative examples of photoinitiators useful in the present invention include, without limitation, ethylbenzoin ether; isopropylbenzoin ether; alpha-methylbenzoin ethyl ether; benzoin phenyl ether; alpha-acyloxime ester; alpha, alpha-diethoxy acetophenone; 1,1-dichloroacetophenone; 2-hydroxy-2-methyl-1-phenyl-propan-1-one (Darocure 1173 of Ciba Geigy company); 1-hydroxy cyclohexyl phenyl ketone (Irgacure 184 of Ciba Geigy company); Darocure 1116; Irgacure 907; anthraquinone; 2-ethylanthraquinone; 2-chloroanthraquinone; thioxanthone; 2-isopropylthioxanthone; 2-chlorothioxanthone; benzophenone; p-chlorobenzophenone; benzylbenzoate; and Michler's ketone. Useful thermal initiators include, for example, azoisobutyronitrile and the like.

A process for manufacturing a solid polymer electrolyte film including the inventive components is described hereinafter. First, the poly(alkylene glycol) of formula (II) and the lithium salt are charged into a reactor at an appropriate mixing ratio, and the mixture is agitated with an agitator so as to prepare a solution. A crosslinking agent of the present invention is added to the solution, and then mixing is carried out. At this time a poly(alkylene glycol) compound of formula (III) can be optionally added. Next, a curing initiator is added into the mixture, and agitation is carried out to form a reaction mixture for manufacturing the solid polymer electrolyte of the present invention. This solution is then spread on a supporting member which is made of, for example, glass or polyethylene, or on a commercial Mylar film. Then the coated member is exposed to electron beams, ultraviolet lights or gamma rays, or heating is carried out, to achieve a curing reaction, thereby forming a film.

Another alternative process for obtaining a film is as follows. The inventive solid polymer electrolyte solution is spread on a supporting member, and a spacer is fixed to each of the ends of the supporting member. Then another supporting member is overlapped on the former member. Next, a curing irradiator or a heat source is used to carry out a curing reaction, thereby manufacturing the solid polymer electrolyte film.

The solid polymer electrolyte thus manufactured according to the present invention can be used to prepare a lithium polymer secondary battery.

The anode of the lithium polymer secondary battery is made of lithium ion intercalating metal oxide/conductive material/binder, while the cathode is made of carbon active material/conductive material/binder, or lithium metal, or lithium metal alloy. The lithium ion intercalating metal oxide includes, for example without limitation, a lithium manganese oxide; a lithium nickel oxide; a lithium cobalt oxide; a lithium vanadium oxide; their composite metal oxides; a metal oxide with a part thereof substituted by a transition metal; and a compound with oxygen and fluorine substituted by a sulfur compound. The carbon active material includes, without limitation, non-crystalline carbons such as cokes; natural graphite; fine fibrous or bead-like meso carbon; tin compounds; and tin treated compounds. All the processes above are carried out under an argon atmosphere at room temperature.

As described above, the present invention provides a solid polymer electrolyte in which the crosslinking agent of formula (I) is mixed with a poly(alkylene glycol) ion conductive polymer, so that the mechanical strengths and the ion conductivity can be improved. The invention further provides a lithium polymer secondary battery employing the solid polymer electrolyte.

The invention is further illustrated by the following non-limiting examples.

Example 1

Into 2 g of poly(ethylene glycol) methyl ether methacrylate (molecular weight: 400, PEGMeM400), were added 0.56 g of tris(2-acryloyloxyethyl) isocyanurate (TAcEI) of the following formula (IV), 2.56 g of poly(ethylene glycol) dimethyl ether (molecular weight: 250, PEGDMe250), and 0.08 g of dimethoxyphenyl acetophenone (DMPA). Lithium trifluoromethane sulfonate (0.66 g) was then added to prepare a mixture solution. Then the mixture solution was spread on a conductive glass substrate, and the substrate was exposed to ultraviolet light of a wavelength of 200 to 400 nm for 5 minutes under an argon atmosphere. In this manner, a highly adhesive solid polymer electrolyte was manufactured.

Experiment on Ion Conductivity

The ion conductivity was measured in the following manner. The reaction mixture was spread on a conductive glass patterned as a band type or on a lithium-copper foil, and was polymerized by carrying out a radiation curing. Then the cured mixture was dried. Next, the AC impedance was measured across band-type or sandwich-type electrodes, and the measured value was analyzed by a frequency analyzer, so that the complex impedance can be interpreted. The band-type electrodes were such that masking tapes with a width of 0.5–2 mm were attached at gaps of 0.5–2 mm on the conductive glass substrate. Then they were put into an etching solution to etch them, and then, a wash and a drying were carried out.

The solid polymer electrolyte film of Example 1 thus measured showed an ion conductivity of $2.52 \times 10^{-4}$ S/cm.

Examples 2–12

In the same manner as that of Example 1, tris (2-acryloyloxyethyl) isocyanurate (TAcEI) of formula (IV) was used as a crosslinking agent.

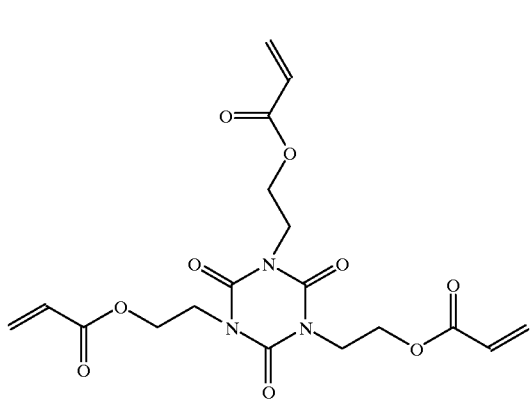

(IV)

Next, PEGMeM 400 corresponding to formula (II), poly (propylene glycol) methyl ether acrylate (molecular weight 260, PPGMeA 260), PEGDMe corresponding to formula (III), and polypropylene glycol diglycidyl ether (molecular weight 380, PPGDGe 380) were added. In this manner, there were manufactured the light-cured crosslinked solid polymer electrolytes which have compositions varied as shown in Table 1 below. Table 1 also shows the ion conductivity at the temperature of 30° C. The photo-initiator was DMPA, and the added amount was uniformly 0.02 g throughout Examples 2 to 12. Further, the lithium salt was lithium trifluoromethane sulfonate, while the ratio of the moles of ethylene oxide [EO] to the lithium salt [Li], i.e., [EO]/[Li] was fixed to 20. The amounts thus calculated were added into the compositions of Examples 2–12. In the case where poly(ethylene oxide) oligomer PEGDMe 250 was added up to about 80 wt %, the solid polymer electrolyte thus manufactured showed an ion conductivity as high as $8.16 \times 10^{-4}$ S/cm. In the case when TAcEI (which is a part of the crosslinking agent of the present invention) was used, the film formability and the mechanical strengths were superior to one employing a conventional crosslinking agent. The resulting polymer electrolytes easily peeled off from the supporting member. Further, when it was bent, no cracks were formed. This made it possible to confirm that the solid polymer electrolytes of the present invention were suitable for use in a lithium secondary battery.

TABLE 1

| | [wt %] | | | | | |
|---|---|---|---|---|---|---|
| Examples | PEGM-eM 400 | PPGM-eA 250 | PEGD-Me 380 | PPGDe | TacEI | Ion condty × $10^{-4}$ (S/cm) |
| Example 1 | 39.1 | — | 50.0 | — | 10.9 | 2.52 |
| Example 2 | 31.2 | — | 60.0 | — | 8.7 | 5.30 |
| Example 3 | 23.4 | — | 70.0 | — | 6.5 | 6.49 |
| Example 4 | 15.6 | — | 80.0 | — | 4.4 | 8.16 |
| Example 5 | — | 31.2 | — | 60.0 | 8.7 | 4.65 |
| Example 6 | — | 23.4 | — | 70.0 | 6.5 | 5.31 |
| Example 7 | 97.3 | — | — | — | 2.7 | 0.197 |
| Example 8 | 93.5 | — | — | — | 6.5 | 0.248 |
| Example 9 | 87.7 | — | — | — | 12.3 | 0.105 |
| Example 10 | 82.6 | — | — | — | 17.4 | 0.110 |
| Example 11 | 41.3 | — | — | — | 8.7 | 3.93 |
| Example 12 | 43.9 | — | — | — | 6.1 | 2.98 |

Comparative Examples 1–6

A conventional crosslinking agent, poly(ethylene glycol) dimethacrylate (molecular weight 400, PEGDMA 400) was used, and the photocuring was carried out in the same manner as that of Example 1 except that the amounts of the components were varied so as to manufacture solid polymer electrolytes. Then the ion conductivities were measured at the temperature of 30° C. Like in the previous Examples, lithium trifluoromethane sulfonate was used as a lithium salt. The ratio of moles of ethylene oxide [EO] to moles of the lithium salt [Li], i.e., [EO]/[Li] was fixed to 20. Then the amounts calculated in this manner were added into the compositions of Comparative Examples 1–6. In the case where the poly(ethylene oxide) oligomer (PEGDMe 250) which affects the ion conductivity was added in amounts of 50 wt % or less, the film could be formed. However, when the amount added exceeded 50 wt %, the film could not be formed, to such a degree that the ion conductivity could not be measured. In the case where the amount was up to 80%, the film was not formed, and therefore, the composition could not be used. Further, even with the same composition, the ion conductivity was lower than the case where TAcEI (which was one of the crosslinking agents of the present invention) was used.

TABLE 2

[wt %]

| Comp. Ex. | PEGMeM-400 | PEGDMe250 | PEGDMA400 | Ionic condty. × $10^{-4}$ (S/cm) |
|---|---|---|---|---|
| 1 | 80.6 | — | 19.4 | 0.108 |
| 2 | 53.7 | 33.4 | 12.9 | 0.900 |
| 3 | 47.4 | 41.2 | 11.4 | 1.310 |
| 4 | 40.3 | 50.0 | 9.7 | 2.360 |
| 5 | 24.2 | 70.0 | 5.8 | 1.290 (poor) |
| 6 | 16.1 | 80.0 | 3.8 | Unmeasurable |

Examples 13–16

The crosslinking agent TAcEI was replaced with tris(2-methacryloyl-oxyethyl)-1,3,5-benzene-tricarboxylate (BAcETC) of formula (V), and photocured solid polymer electrolytes were manufactured in the same manner as that of Example 1

(V)

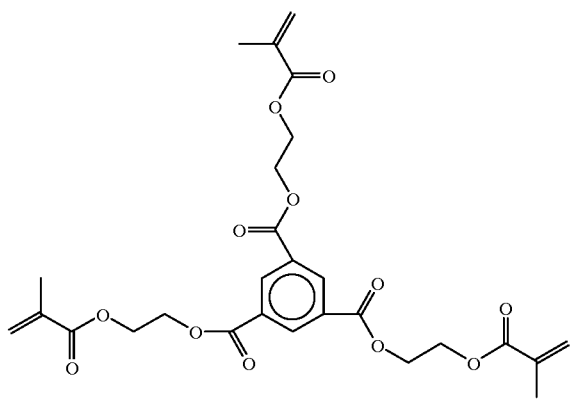

The ion conductivities are shown in Table 3 below, after measuring them at the temperature of 30° C. In these Examples, like in the previous Examples, the lithium salt was lithium trifluoromethane sulfonate. The ratio of moles of ethylene oxide [EO] to moles of lithium salt [Li] was fixed to 20, and then, the relevant amounts were calculated based on the ratio to add them to the compositions of Examples 13–16.

TABLE 3

[wt %]

| Example | PEGMeM400 | PEGDMe250 | BAcETC | Ionic condty. × $10^{-4}$ (S/cm) |
|---|---|---|---|---|
| Example 13 | 36.6 | 13.4 | 50.0 | 2.752 |
| Example 14 | 29.3 | 10.7 | 60.0 | 4.433 |
| Example 15 | 28.9 | 21.1 | 50.0 | 2.305 |
| Example 16 | 23.1 | 16.9 | 60.0 | 3.016 |

Examples 17–20

One of the crosslinking agents of the present invention, i.e., the compound of formula (VI), i.e., tris(2-methacryloyloxyethyl)-1,3,5-cyclohexanetricarboxylate (CHAcETC) was used, and photocured solid polymer electrolytes were manufactured in the same manner as that of Example 1 by varying the compositions.

(VI)

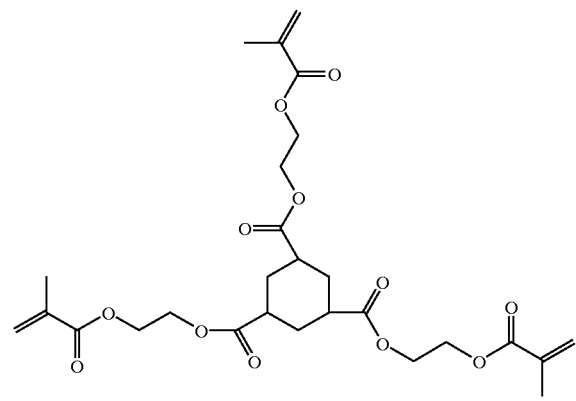

The ion conductivities were measured at the temperature of 30° C., and the measured results are shown in Table 4 below. Like in the previous Examples, the lithium salt was lithium-trifluoromethane sulfonate. The ratio of moles of ethylene oxide [EO] to moles of lithium salt [Li] was fixed to 20, and then, the relevant amounts were calculated based on the ratio to add them to the compositions of Examples 17–20.

TABLE 4

[wt %]

| Example | PEGMeM400 | PEGDMe250 | CHAc-ETC | Ionic condty. × $10^{-4}$ (S/cm) |
|---|---|---|---|---|
| Example 17 | 36.6 | 50.0 | 13.4 | 2.652 |
| Example 18 | 29.2 | 60.0 | 10.8 | 3.254 |
| Example 19 | 28.8 | 50.0 | 21.2 | 2.175 |
| Example 20 | 23.0 | 60.0 | 17.0 | 4.201 |

Example 21: Experiment on Electrochemical Stability

| | Composition |
|---|---|
| Poly(alkylene glycol) | poly(ethylene glycol) 500) dimethoxy ether (35.1 wt %), poly(ethylene glycol 400) monomethyl ether monomethacrylate (42.5 wt %); |
| lithium salt | $LiClO_4$ (10.7 wt %); |
| crosslinking agent | tris(2-acryloyloxyethyl) isocyanurate (9.1 wt %) |
| initiator | Darocur 1173 (2.6 wt %). |

First, 1.0 g of the lithium salt ($LiClO_4$), 3.27 g of poly(ethylene glycol) 500 dimethoxyether, and 3.97 g of poly(ethylene glycol) 400 monomethylether monometacrylate were put into a reactor and agitated. Further, 0.85 g of the crosslinking agent tris(acryloyloxyethyl isocianurate) was added into the mixture solution. Then 0.24 g of the photoinitiator (Darocure 1173) was added, and the mixture solution was agitated for 30 seconds. The composition thus prepared was spread on a glass substrate and was coated by using a proper coating bar (doctor blade, 0.02 mm), or the spread film was fixed on both ends of the glass substrate, and another glass substrate was overlapped. In this state, the spread solution was cured by irradiation with ultraviolet light using an irradiator (wavelength: 365 nm, 1 kW). The cured film was separated from the glass substrate, and the electrochemical stability of the resulting solid polymer electrolyte was measured in the following manner.

The electrolyte film was cut into pieces of 2×2 cm, and this film was sandwiched between a stainless steel substrate and lithium metal. Then it was vacuum-sealed, thereby completing a cell for measuring the electrochemical stability. The electrochemical stability was measured by linear sweep voltammetry at a sweep rate of 5 mV/sec up to 3.0–6.0 V. The measured cyclicvoltammogram is illustrated in FIG. 1. The measurement showed that a decomposition occurred at above 5 V. Therefore, it could be confirmed that the solid polymer electrolyte using the isocyanurate crosslinking agent of the present invention has a sufficient electrochemical stability for it to be suitable for use in a lithium polymer secondary battery.

According to the present invention as described above, a new crosslinking agent for use in a solid polymer electrolyte with improved mechanical properties and with improved ion conductivity is provided.

The crosslinking agent of the present invention is constituted such that three ethylene glycol acrylates (i.e., acrylate-substituted poly(ethylene oxide) oligomers) are bonded to a central cyclic alkyl or heteroalkyl molecule. The solid polymer electrolyte using the inventive crosslinking agent forms a 3-dimensional network structure. In the solid polymer electrolyte using the new crosslinking agent, the central portion consists of a hard segment having a 6-membered cyclic structure so as to maintain uniform distances between the linear and branched polymer chains. Further, soft segments of the poly(ethylene oxide) oligomers are formed outward from the central portion, so that the lithium salt can be dissolved. Thus, reinforcement of the mechanical properties of the solid polymer electrolyte and improved lithium salt dissolution are realized. The mechanical strength and the ionic conductivity are improved, resulting in a solid polymer electrolyte that is suitable for use in a lithium polymer secondary battery.

What is claimed is:
1. A solid polymer electrolyte comprising:
   (a) a crosslinking agent comprising a compound represented by formula (I):

(I)

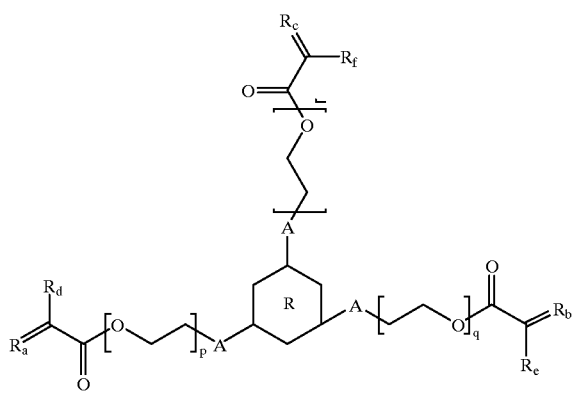

wherein
A is oxygen, COO, alkyl of $C_{1-4}$, or a single bond,
R is a 6-membered aliphatic, aromatic or heterocyclic group,
$R_a$, $R_b$ and $R_c$ independently are a linear or branched alkyl group of $C_{1-10}$,
$R_d$, $R_e$ and $R_f$ independently are H or a methyl group, and
p, q and r independently are an integer of 1 from 20;
   (b) a poly(alkylene glycol) alkyl ether alkyl (meth) acrylate of formula (II)

(II)

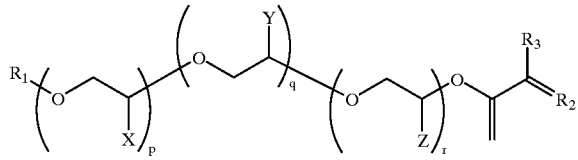

wherein
$R_1$ and $R_2$ independently are a linear or branched aliphatic or aromatic group of $C_{1-10}$,
$R_3$, X, Y, Z independently are H or a methyl group, and
p, q and r independently are an integer from 1 to 20;
   (c) a lithium salt; and
   (d) a curing initiator.

2. The solid polymer electrolyte as claimed in claim 1 wherein the crosslinking agent (a) R is selected from the group consisting of cyclohexane, benzene, triazine, trioxane and isocyanurate.

3. The solid polymer electrolyte as claimed in claim 1 wherein said crosslinking agent (a) is selected from the group consisting of tris (2-acryloyloxyethyl) isocyanurate, tris (2-methacryloyloxyethyl)-1,3,5-benezenetricarboxylate, tris (2-methacryloyloxyethyl)-1,3,5-cyclohexanetricarboxylate.

4. The solid polymer electrolyte as claimed in claim 1 wherein said poly(alkylene glycol) alkyl ether alkyl (meth) acrylate (b) is selected from the group consisting of poly (ethylene glycol) methyl ether methacrylate, poly(ethylene glycol) methyl ether acrylate, poly(propylene glycol) methyl ether acrylate, poly(ethylene glycol) phenyl ether acrylate, and a mixture thereof.

5. The solid polymer electrolyte as claimed in claim 1 further comprising a poly(alkylene glycol) dialkyl ether of formula (III):

(III)

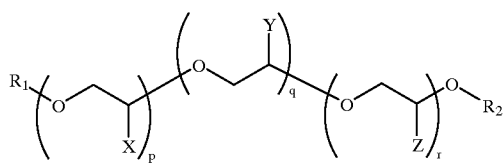

wherein
$R_1$ and $R_2$ independently are a linear or branched alkyl group of $C_{1-10}$,
X, Y and Z independently are H or a methyl group, and
p, q and r independently are 0 or an integer from 1 to 20.

6. The solid polymer electrolyte as claimed in claim 5 wherein said poly(alkylene glycol) dialkyl ether is selected from the group consisting of poly(ethylene glycol) dimethyl ether, poly(ethylene glycol) diethyl ether, poly(ethylene glycol) dipropyl ether, poly(ethylene glycol) dibutyl ether, poly(ethylene glycol) diglycidyl ether, poly(propylene glycol) dimethyl ether, poly(propylene glycol) diglycidyl ether, poly(propylene glycol)/poly(ethylene glycol) copolymer dibutyl ether, poly(ethylene glycol)/poly(propylene glycol) block copolymer dibutyl ether, and mixtures thereof.

7. The solid polymer electrolyte as claimed in claim 5 wherein said poly(alkylene glycol) dialkyl ether is used in an amount from about 0.1 wt % to about 80 wt % based on the weight of the solid polymer electrolyte.

8. The solid polymer electrolyte as claimed in claim 1 wherein said lithium salt (c) is selected from the group consisting of LiClO$_4$, LiCF$_3$SO$_3$, LiBF$_4$, LiPF$_6$, LiAsF$_6$, and Li(CF$_3$SO$_2$)$_2$N.

9. The solid polymer electrolyte as claimed in claim 1 wherein said curing initiator (d) is selected from the group consisting of ethyl benzoin ether, isopropyl benzoin ether, alpha-methylbenzoin ethyl ether, benzoin phenyl ether, alpha-acyloxime ester, alpha, alpha-diethoxy acetophenone, 1,1-dichloroacetophenone, 2-hydroxy-2-methyl-1-phenylpropan-1-one, 1-hydroxy cyclohexyl phenyl ketone, anthraquinone, 2-ethylanthraquinone, 2-chloroanthraquinone, thioxanthone, 2-isopropyl-thioxanthone, 2-chlorothioxanthone, benzophenone, p-chlorobenzophenone, benzylbenzoate, Michler's ketone, and azoisobutyronitrile.

10. The solid polymer electrolyte as claimed in claim 1 wherein said crosslinking agent (a) is used in an amount from about 0.1 to about 60 wt % based on the weight of the solid polymer electrolyte.

11. The solid polymer electrolyte as claimed in claim 1 wherein said poly(alkylene glycol) alkyl ether alkyl (meth) acrylate (b) is used in an amount from about 0.1 to about 85 wt % based on the weight of the solid polymer electrolyte.

12. The solid polymer electrolyte as claimed in claim 1 wherein said lithium salt (c) is used in an amount from about 3 to about 30 wt % based on the weight of the solid polymer electrolyte.

13. The solid polymer electrolyte as claimed in claim 1 wherein said curing initiator (d) is used in an amount from about 0.5 to about 5 wt % based on the weight of the solid polymer electrolyte.

14. The solid polymer electrolyte as claimed in claim 4 wherein the crosslinking agent (a) includes (i) a hard segment comprising a 6-member cyclic structure, and (ii) soft segments comprising three linear or branched oligomeric poly(ehtylene oxide) chains substituted on the hard segment at the 1,3 and 5 positions.

15. A lithium polymer secondary battery comprising
   (i) an anode,
   (ii) a cathode, and
   (iii) a solid polymer electrolyte comprising
      (a) a crosslinking agent comprising a compound represented by formula (I):

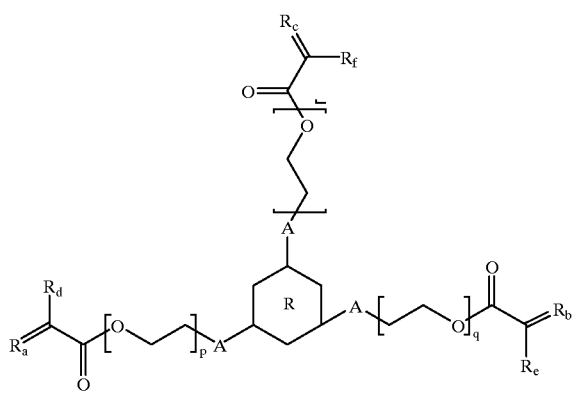

(I)

wherein

A is oxygen, COO, alkyl of C$_{1-4}$, or a single bond,

R is a 6-membered aliphatic, aromatic or heterocyclic group,

R$_a$, R$_b$ and R$_c$ independently are a linear or branched alkyl group of C$_{1-10}$, R$_d$, R$_e$ and R$_f$ independently are H or a methyl group, and p, q and r independently are an integer of 1 from 20;

(b) a poly(alkylene glycol) alkyl ether alkyl (meth) acrylate of formula (II)

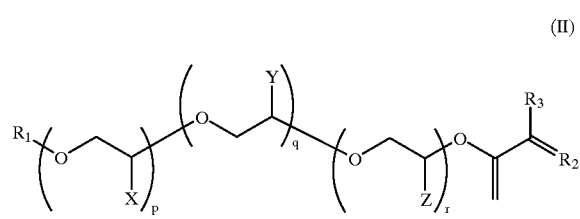

(II)

wherein

R$_1$ and R$_2$ independently are a linear or branched aliphatic or aromatic group of C$_{1-10}$, R$_3$, X, Y, Z independently are H or a methyl group, and p, q and r independently are an integer from 1 to 20;

(c) a lithium salt; and
   (d) a curing initiator.

16. The lithium polymer secondary battery as claimed in claim 15 wherein said solid polymer electrolyte (iii) further comprises a poly(alkylene glycol) diallyl ether of formula (III):

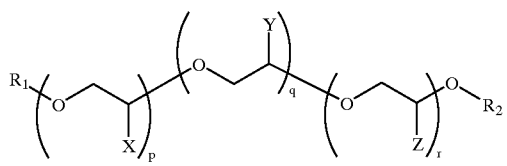

(III)

wherein

R$_1$ and R$_2$ independently are a linear or branched alkyl group of C$_{1-10}$, X, Y and Z independently are H or a methyl group, and p, q and r independently are 0 or an integer from 1 to 20.

* * * * *